United States Patent [19]

Birnbaum et al.

[11] 3,769,169

[45] Oct. 30, 1973

[54] FERMENTATION PROCESS

[75] Inventors: Jerome Birnbaum, Morganville; Edward Inamine, Rahway, both of N.J.

[73] Assignee: Merck & Co., Inc., Rahway, N.J.

[22] Filed: May 20, 1971

[21] Appl. No.: 145,573

[52] U.S. Cl.................. 195/80, 195/36, 260/243 C
[51] Int. Cl............................................... C12k 1/00
[58] Field of Search............................. 195/36 R, 80

[56] References Cited
UNITED STATES PATENTS
3,436,310   4/1969   Arnold et al....................... 195/36 R Primary Examiner—A. Louis Monacell
Assistant Examiner—Robert J. Warden
Attorney—Rudolph J. Anderson, Jr. et al.

[57] ABSTRACT

A method for improving the yield of 7-(D-5-amino-5-carboxylvaleramido)-3-(carbamoyloxymethyl)-7-methoxy-3-cephem-4-carboxylic acid by adding to fermentation media an additive selected from glycine, L-phenylalanine, a carbamate or an amide, or combinations thereof. The product is a new antibiotic produced from a new strain of Streptomyces; it exhibits activity against gram-negative and gram-positive bacteria.

12 Claims, No Drawings

FERMENTATION PROCESS

This invention relates to an improved fermentation process for the production of the antibiotic 7-(D-5-amino-5-carboxyvaleramido)-3-(carbamoyloxymethyl)-7-methoxy-3-cephem-4-carboxylic acid. In particular, this invention relates to an improved method for the production of the said antibiotic via the fermentation of nutrient media with suitable strains of the microorganism *Streptomyces lactamdurans*.

The *Streptomyces lactamdurans* culture is a new strain of actinomycete and a sample of this microorganism, designated as MA-2908, has been placed in the culture collection of Merck & Co., Inc., Rahway, New Jersey. A sample of this culture has also been placed on permanent deposit with the culture collection of the Northern Utilization Research and Development Branch of the U.S. Department of Agriculture at Peoria, Illinois. This culture has been assigned the culture number NRRL 3802.

The 7-(D-5-amino-5-carboxyvaleramido)-3-(carbamoyloxy-methyl)-7-methoxy-3-cephem-4-carboxylic acid (hereinafter referred to as the "antibiotic") is produced during the aerobic fermentation of suitable aqueous nutrient media under controlled conditions. Aqueous media such as those employed for the production of other antibiotics are suitable. Such media contain sources of carbon and nitrogen which are assimilable by the microorganism and inorganic salts. In addition, the fermentation media contain traces of metals necessary for the growth of the microorganism which are commonly supplied as impurities incidental to the other constituents of the medium. In general, carbohydrates such as sugars, for example, sucrose, maltose, fructose, lactose and the like, and starches such as grains, for example oats and rye, corn starch, corn meal and the like, can be used either alone or in combination as sources of assimilable carbon in the nutrient medium. The exact amount of the carbohydrate source or sources utilized in the medium will depend in part upon the other ingredients of the medium. It has been found, however, that an amount of carbohydrate between about 1 and 6 percent by weight of the medium is sufficient. A single carbon source may be used, or several carbon sources may be combined in the medium.

Satisfactory nitrogen sources include myriad proteinaceous materials such as various forms of hydrolysates of casein, soybean meal, corn steep liquor, distilled solubles, yeast products tomato paste, and the like. The various sources of nitrogen can be used either alone or in combination, and are used in amounts ranging from 0.2 - 6 percent by weight of the aqueous medium.

The expression: "complex organic media" as used in this specification means media wherein some of the ingre-dients are not chemically defined. An example of such media is one consisting of crescent brand oats, soybean meal, sodium citrate, polyglycol, and distillers solubles.

The fermentation is carried out at temperatures ranging from 20°C. to 37°C.; however, for optimum results it is preferable to conduct the fermentation at temperatures of from about 24°C. to 32°C. The pH of the nutrient mediums suitable for growing the *Streptomyces lactamdurans* culture and producing the antibiotic should be in the range of from about 6.0 to 8.0.

7-(D-5-Amino-5-carboxyvaleramido)-3-(carbamoyloxymethyl)-7-methoxy-3-cephem-4-carboxylic acid has the following planar formula:

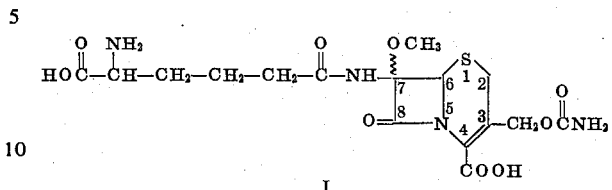

This compound (I) is produced during the aerobic fermentation described above from a strain of *Streptomyces lactamdurans* capable of producing said compound as, for example, from the strain on permanent deposit at the Northern Utilization Research and Development Branch under accession number NRRL 3802. Other strains of this species, such as mutants obtained by mutating agents or isolated from nature, can also be used. The antibiotic (I) is amphoteric with an apparent isoelectric point of about pH 3.5, and is stable in solution at a pH range of about 1.5 – 9.0.

The antibiotic and its salts demonstrate resistance not only to penicillinase but to the cephalosporinases as well and exhibit an enhanced activity against gram-negative microorganisms. Unlike cephalosporin C which has a relatively low antibacterial activity, the antibiotic of this invention and its salts exhibit a significant in vivo gram-negative effect with a potency which, in general, is greater than cephalothin. This activity includes effectiveness in vivo on *Proteus morganii* and, in addition, an effectiveness against the following gram-negative bacteria: *Escherichia coli, Proteus vulgaris, Proteus mirabilis, Salmonella schottmuelleri, Klebsiella pneumoniae AD, Klebsiella pneumoniae B* and *Paracolobactrum arizoniae*.

Bioassays for this antibiotic are run by a disc-plate procedure using ⅝ inch filter paper discs. The assay plates are prepared using Difco nutrient agar plus 2.0 g./l. Difco yeast extract at 10 ml. per plate. An overnight growth of the assay organism, *Vibrio percolans* MB-1272 is diluted in sterile saline solution to a suspension having 40 percent transmittance at a wave length of 660 mμ. This suspension is added to 20 ml./liter to medium prior to pouring the plates. The *Vibrio percolans* organism is on deposit in the Culture Collection of the American Type Culture Collection where it is available under the following designation: *Vibrio percolans* MB-1272, ATCC 8461.

The assay plates are held at 4°C. until used (5 day maximum). Following the application of the antibiotic-saturated assay discs the plates are incubated at 28°C. for a period of from 8 to 24 hours. Zones of inhibition are read as mm. diameter. They are used to determine relative potencies or, when compared with a purified reference standard, the potency in μg/ml.

Due to the inherent difficulty in separating pure 7-(D-5-amino-5-carboxyvaleramido)-3-(carbamoyloxymethyl)-7-methoxy-3-cephem-4-carboxylic acid from the large quantities of impurities in the fermentation broth, it is of great importance to find a way to increase the concentration of the antibiotic relative to the total broth solids.

It is, therefore, an object of this invention to provide a method of increasing the yield of the antibiotic in a fermentation process. It is a further object of this invention to provide a method of increasing the yield of antibiotic using relatively inexpensive, readily available chemical additives in the fermentation process. Further objects of the invention will become apparent.

It has now been discovered that the addition of glycine, L-phenylalanine, a carbamate of Formula II, infra, or an amide of Formula III, infra, to complex organic and chemically defined fermentation media will enhance the production of 7-(D-5-amino-5-carboxyvaleramido)-3-(carbamoyloxymethyl)-7-methoxy-3-cephem-4-carboxylic acid:

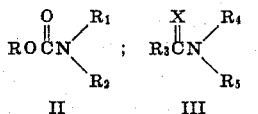

wherein R is alkyl, for example, lower alkyl such as ethyl, n-propyl or n-butyl and the like and $R_1$ and $R_2$ are the same or different members selected from hydrogen, alkyl, for example, lower alkyl such as methyl, ethyl, n-propyl or n-butyl and the like or hydroxy-lower alkyl, for example, 2-hydroxyethyl or 3-hydroxypropyl and the like; $R_3$ is hydrogen, alkyl, such as methyl, ethyl, n-propyl, n-butyl, n-pentyl or undecyl and the like, oxo substituted lower alkyl such as 2-oxopropyl and the like or aryl, for example, mononuclear aryl such as phenyl; and $R_4$ and $R_5$ are the same or different members selected from hydrogen, alkyl, for example, lower alkyl such as methyl, ethyl, n-propyl, n-butyl, isobutyl or n-pentyl and the like, or hydroxy-lower alkyl such as 2-hydroxyethyl or 3-hydroxypropyl and the like; and X is oxygen or sulfur.

The amount of glycine, L-phenylalanine, carbamate (II) or amide (III) needed to stimulate production of the antibiotic varies with the medium employed. In general, increased production of the antibiotic has been observed in media containing from 0.01 – 0.10 percent (weight/volume) of glycine and from 0.05 – 0.3 percent (weight/volume) of L-phenylalanine. However, preferred concentrations are 0.05% glycine and 0.3% L-phenyl-alanine. The carbamates (II) and amides (III) are employed in the range of from about 0.0156 – 2.0 percent and especially good yields have been obtained with N-2-hydroxyethyl alkylcarbamates as, for example, with from about 0.2 – 0.8 percent of ethyl N-2-hydroxyethylcarbamate.

Also, we have found that the addition of an amide of the following formula to the fermentation medium will effect a significant increase in yield of antibiotic:

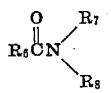

wherein $R_6$ is hydrogen or lower alkyl such as methyl or ethyl and $R_7$ and $R_8$ are hydrogen or lower alkyl especially isobutyl. The compound N,N-diisobutylpropionamide is particularly preferred and affords superior yields when employed at a concentration of from about 0.063 – 0.125 of the medium employed. Concentrations of glycine greater than 0.3 percent, concentrations of L-phenylalanine greater than 0.5 percent and concentrations of carbamates greater than 0.8 percent tend to decrease production of the antibiotic.

In addition to being used singly we have found that glycine, L-phenylalanine, and a carbamate of Formula II, supra, and/or an amide of Formula III, supra, may be combined to afford an additive which will induce a particularly good yield of antibiotic. Thus, for example, the combination of 0.05% glycine, 0.3% L-phenylalanine and an amount of carbamate (II) and/or amide (III) falling within the range of 0.0156 – 2.0 percent final concentration is particularly suitable in stimulating the yield of antibiotic. Preferably, in this combination, the carbamate is ethyl N-2-hydroxyethylcarbamate at a final concentration of 0.2 – 0.8 percent and the amide is N,N-diisobutylpropionamide at a final concentration of 0.063 – 0.125 percent.

The above discussion is primarily directed to fermentations using the parent strain *Streptomyces lactamdurans*. However, other strains of this organism such as mutants, can also be used to produce the antibiotic. It is deemed obvious to one skilled in the art that the carbamate (II) or amide (III) additives can also be used to increase antibiotic yield, when added to the fermentation batches. Following the teaching of this invention, obvious modifications or changes in optimal levels of additive, time of addition during fermentation, etc., will be within the purview of one skilled in the art regardless of which strain of *Streptomyces lactamdurans* is used to produce the 7-(D-5-amino-5-carboxyvaleramido)-3-(carbamoyloxymethyl)-7-methoxy-3-cephem-4-carboxylic acid (I).

Although the antibiotic (I) of this invention is produced by both surface and submerged cultures, it is presently preferred to carry out the fermentation in the submerged state. Small scale fermentations are conveniently carried out by placing suitable quantities of nutrient medium in flasks, sterilizing the flasks and contents by heating to 120°C., inoculating the flasks with either spores or a vegetative cellular growth of a 7-(D-5-amino-5-carboxyvaleramido)-3-(carbamoyloxymethyl)-7-methoxy-3-cephem-4-carboxylic acid producing strain of Streptomyces, loosely stoppering the necks of the flasks with cotton, and permitting the fermentation to proceed in a constant room temperature at about 28°C. on a shaker for 3–5 days. For larger scale work, it is preferable to conduct the fermentation in suitable tanks provided with an agitator and a means of aerating the fermentation medium. In this method, the nutrient medium is made up in the tank and sterilized by heating at 120°C. After cooling, the sterilized medium is inoculated with a suitable source of vegetative cellular growth of the Streptomyces and the fermentation is permitted to proceed for 2-4 days while agitating and/or aerating the nutrient medium and maintaining the temperature at about 28°C. This method of producing 7-(D-5-amino-5-carboxyvaleramido)-3-(carbamoyloxymethyl)-7-methoxy-3-cephem-4-carboxylic acid is particularly suited for the preparation of large quantities of the new antibiotic.

The fermentation using the 7-(D-5-amino-5-carboxyvaleramido)-3-(carbamoyloxymethyl)-7-methoxy-3-cephem-4-carboxylic acid producing microorganism can be carried out at temperatures ranging from about 20°–37°C. For optimum results, however, it is most convenient to conduct the fermentations at temperatures between 26°–30°C. The pH of the nutrient media suitable for growing the Streptomyces and producing the antibiotic may vary from about 5 to 9. The preferred pH range, however, is from about 6.0 to 7.5.

In carrying out the invention, a cell suspension is prepared by the addition of sterile medium to an agar slant culture of a 7-(D-5-amino-5-carboxyvaleramido)-3-(carbamoyloxymethyl)-7-methoxy-3-cephem-4-carboxylic acid producing microorganism. Growth from the slant culture is then used to inoculate a seed flask and the seek flask is shaken at about 28°C. for 1–3 days in order to obtain good growth. The seed flask is then used to inoculate the production flasks. Alternatively, the seed flask can be inoculated from a lyophilized culture or a frozen inoculum.

The inoculation is generally carried out using about 1 ml. per 40 ml. of production medium. The desired concentration of additive is then added to the production flasks and the fermentation is permitted to proceed for 2–4 days while agitating and/or aerating the nutrient medium and maintaining the temperature at about 28°C. All of the production flasks, i.e., those containing additives and the flisks used as controls, are then assayed, generally after 96 hours, to determine the amount of antibiotic produced in each flask.

The antibiotic 7-(D-5-amino-5-carboxyvaleramido)-3-(carbamoyloxymethyl)-7-methoxy-3-cephem-4-carboxylic acid were conveniently assayed by means of a disc-plate procedure using *Vibrio percolans* MB-1272 (ATCC 8461) as the assay organism. Discs of ⅜-inch diameter were used. A standard curve was prepared from known concentrations of the antibiotic and activity was expressed in micrograms, i.e., mg., per milliliter of free acid.

The production flasks were then assayed by diluting the sample in 0.02 molar phosphate buffer at pH 7 to an appropriate concentration. The test organism was *Vibrio percolans* MB-1272 (ATCC 8461) and the assay medium employed was Difco nutrient agar plus 0.2% Difco yeast extract. The discs were dipped into 5 mg. per milliliter of the standard antibiotic solution, and were placed on the plate in a position alternate to the sample. The plates were then incubated at 37°C. for 18 hours, and the zone diameters in millimeters were determined. Five standard plates containing four levels of the standard ranging from 2.5 to 20 mg./ml. were employed. The assay was calculated by means of a Nomograph and the results reported in terms of micrograms per milliliter.

The antibiotic can be recovered from the fermentation medium by a number of procedures. The filtered broth can be passed through one or more ion exchange columns. The amphoteric nature of the antibiotic (I) enables selection of both cationic and anionic ion exchange resins to optimize recovery. The adsorbed antibiotic can then be removed by elution, preferably in a volatile solvent such as pyridine which can be easily removed.

The antibiotic 7-(D-5-amino-5-carboxyvaleramido)-3-(carbamoyloxymethyl)-7-methoxy-3-cephem-4-carboxylic acid (I) and its salts are effective in inhibiting the growth of various gram-negative and gram-positive microorganisms.

The following examples are given for purposes of illustration and not by way of limitation.

EXAMPLE 1

Antibiotic Production; Addition of Glycine Modified Fermentation Process:

Step A: Slants

A lyophilized tube of Streptomyces lactamdurans culture (MA-2908) was opened asceptically and the organism transferred to a medium of the following composition:

Medium I:
1 percent Blackstrap Molasses
1 percent National Brewer's Yeast
2.5 percent Difco Agar pH 7.0
Water to Volume The slants are incubated for seven days at 28°C. When stored in the cold, the slants are stable for more than 13 weeks.

Step B: Seed Stages: Two Stage System

First Seed: The first seed is inoculated directly from the slant of Step A to 40 ml. of 1 percent Primary Dried Yeast N.F., pH 7.0 (obtained from the Yeast Product Corporation) in a 250 ml. baffled Erlenmeyer flask. The flasks were then shaken on a 220 rpm. rotary shaker with a two inch-throw at 28°C. for a period of from two to three days.

Second Seed: A 2.5 percent inoculum from the first seed stage was added to a flask containing a 2% Fleischmann S-150 yeast autolysate, pH 7.0. The growth in this stage is characteristically light and the incubation, performed as in the first stage at 28°C, was not extended beyond 48 hours.

Step C: Basal Production Medium

The basal production medium had the following composition:

Medium II:
Distiller's Solubles — 3.0%
Primary Dried Yeast — 0.75%
Mobil par-S Defoamer — 0.25%

This medium was adjusted to pH 7.0 with a small amount of concentrated sodium hydroxide solution, dispensed into Erlenmeyer flasks and autoclaved for 15 to 20 minutes at 121°C. After cooling the medium received a 2.5 percent inoculum of the second stage seed obtained in Step B. Incubation was for three days at 28°C. on a 220 rpm rotary shaker with a two inch throw.

When the fermentation was complete, the cells were removed by centrifugation and the broth was diluted with phosphate buffer, pH 7.0. The concentration of 7-(D-5-amino-5-carboxyvaleramido)-3-(carbamoyloxymethyl)-7-methoxy-3-cephem-4-carboxylic acid in the fermentation broth was determined by the standard biological-disc assay method. The assay organism employed was *Vibrio percolans* (ATCC 8461). Filter paper discs were emersed in the diluted broths and placed on the surface of agar-containing Petri dishes that had been inoculated with the assay organism *Vibrio percolans* (ATCC 8461). Also placed on these Petri dishes were discs that had been dipped previously in standard solutions containing known concentrations of 842A. The discs were incubated overnight at 28°C. and the diameters of the zones of inhibition recorded. The concentration of 842A and the fermented broth is calculated by interpolation from the standard curve which relates zone diameter with the known concentrations of standard 842A solutions. By this procedure it was calculated that *Streptomyces lactamdurans* MB-2908 produced an average of 80.4 μg/ml. of 7-(D-5-amino-5-carboxyvaleramido)-3-(carbamoyloxymethyl)-7-methoxy-3-cephem-4-carboxylic acid in the basal production medium.

Step D: Addition of Glycine

The addition of glycine to Medium II in Step C, supra, increased the yield of 7-(D-5-amino-5-carboxyvaler-amido)-3-(carbamoyloxymethyl)-7-methoxy-3-cephem-4-carboxylic acid significantly. Table I below indicates the extent of this increase over a range of concentrations. The data in this Table represents three separate series of tests in which the control was conducted in the same manner as described in Steps A–C above and in which the remaining experiments were conducted in an identical manner but with the addition of the indicated amount of glycine. The assays were conducted in the same manner as in Step C.

TABLE I

| Experiment | % Glycine Added to Medium II | Antibiotic Production (μg/ml) | % Increase Over Control |
|---|---|---|---|
| Control | | 77 | |
| 1 | 0.10 | 84 | 10% |
| 2 | 0.10 | 97 | 26% |
| Control | | 76 | |
| 1 | 0.05 | 106 | 41% |
| 2 | 0.10 | 93 | 22% |
| Control | | 88 | |
| 1 | 0.075 | 113 | 28% |
| 2 | 0.100 | 113 | 28% |
| 3 | 0.125 | 98 | 11% |

On the basis of the foregoing the addition of 0.05% glycine to the production medium was judged most effective in increasing the yield of 7-(D-5-amino-5-carboxyvaleramido)-3-(carbamoyloxymethyl)-7-methoxy-3-cephem-4-carboxylic acid.

EXAMPLE 2

Antibiotic Production; Addition of L-Phenylalanine

The procedure of Example 1 was repeated except that various concentrations of L-phenylalanine were substituted for the glycine additive in Step D. The following Table indicates the concentrations at which L-phenylanine was employed and the increase in yield of Antibiotic (I) attributed thereto.

TABLE II

| Experiment | % L-Phenylalanine added to Medium II | Antibiotic Production (μg/ml) | % Increase Over Control |
|---|---|---|---|
| Control | | 76 | |
| 1 | 0.05 | 82 | 8% |
| 2 | 0.1 | 77 | 1% |
| 3 | 0.3 | 90 | 34% |
| Control | | 85 | |
| 1 | 0.1 | 100 | 18% |

EXAMPLE 3

Antibiotic Production; Addition of L-Phenylalanine and Glycine

The procedure of Example 1 was repeated except that L-phenylalanine was added to a basal production medium containing 0.05% glycine. This medium, identified below as Medium III, has the following composition:

Medium III:
Distiller's Solubles — 3.0%
Primary Dried Yeast N.F. — 0.75%
Mobil par-S Defoamer — 0.25%
Glycine — 0.05%

The following Table indicates the concentrations at which L-phenylalanine was employed and the increase in yield of Antibiotic (I) attributed thereto.

TABLE III

| Experiment | % L-Phenylalanine added to Medium III | Antibiotic Production (μg/ml) | % Increase Over Control |
|---|---|---|---|
| Control | | 101 | |
| 1 | 0.1 | 124 | 23% |
| Control | | 103 | |
| 1 | 0.3 | 118 | 15% |
| Control | | 110 | |
| 1 | 0.3 | 121 | 10% |

EXAMPLE 4

Antibiotic Production; Addition of Ethyl Carbamate and Glycine

The procedure of Example 3 was repeated except that ethyl carbamate was substituted for L-phenylalanine. The production medium employed was Medium III of Example 3 which contains 0.05% glycine. The following Table indicates the concentrations at which ethyl carbamate was employed and the increase in yield of Antibiotic (I) attributed thereto.

TABLE IV

| Experiment | % Ethyle Carbamate added to Medium III | Antibiotic Production* (μg/ml) | Percent Increase Over Control |
|---|---|---|---|
| Control | | 109 | |
| 1 | 0.01 | 101 | |
| 2 | 0.1 | 112 | 2.8% |
| 3 | 0.5 | 141 | 30% |
| Control | | 86 | |
| 1 | 0.3 | 126 | 47% |
| 2 | 0.4 | 124 | 45% |
| 3 | 0.5 | 118 | 39% |
| 4 | 0.6 | 115 | 35% |
| 5 | 0.7 | 98 | 15% |
| 6 | 0.8 | 92 | 8% |
| Control | | 113 | |
| 1 | 0.1 | 126 | 11% |
| 2 | 0.2 | 146 | 29% |
| 3 | 0.3 | 157 | 38% |
| 4 | 0.4 | 169 | 49% |
| 5 | 0.5 | 165 | 45% |
| 6 | 0.6 | 168 | 48% |

*Each yield is the average of 8 individual assays. On the basis of the foregoing the addition of 0.4% ethyl carbamate to Medium III was most effective in increasing the yield of Antibiotic (I).

EXAMPLE 5

Antibiotic Production; Addition of Amides

The procedure of Example 1, Steps A–C was repeated except that the incubation period of Step C was for four days at 28°C. and the basal production medium had the following composition:

Medium IV:
Distiller's Solubles — 3.0%
Primary Dried Yeast — 1.0%
Glycine — 0.05%
L-Phenylalanine — 0.3%
Mobile par S-Defoamer — 0.25%
Sodium Thiosulfate — 0.1%
Cornstarch — 2.0%

Upon adding the amides in the following Table to Medium IV and otherwise following the procedure described in Example 1, Step C, an increase in the yield of Antibiotic (I) was noted. Table V infra describes these amides, the concentrations at which they were employed and the increases in yield attributed thereto.

TABLE V

| Additive | % Final Concentration | Antibiotic Production (μg/ml) with Additive/Control | |
|---|---|---|---|
| | | No. 1 | No. 2 |
| Formamide | 0.25 | | 332/256 |
| | 0.50 | | 354/256 |
| N-Methyl-formamide | 1.0 | 285/254 | |
| | 2.0 | 312/254 | |
| N,N-Diethyl-formamide | 0.25 | 287/238 | |
| | 0.40 | 346/273 | 301/256 |
| | 0.50 | 297/238 | |
| | 0.80 | 381/273 | 328/256 |
| | 1.0 | 388/273 | 387/256 |
| N,N,Diethyl-formamide | 0.25 | 309/254 | |
| | 0.5 | 351/254 | |
| | 1.0 | 391/254 | |
| N,N,Dibutyl-formamide | 0.125 | 260/254 | |
| | 0.25 | 285/254 | |
| N-2-Hydroxy-ethylformaide | 0.25 | | 310/256 |
| | 0.50 | | 338/256 |
| | 1.0 | | 372/256 |
| N,N-Dimethyl-benzamide | 0.312 | | 293/256 |
| | 0.0625 | | 313/256 |
| | 0.125 | | 369/256 |
| N,N-Dimethyl-acetamide | 0.5 | 360/254 | |
| | 1.0 | 354/254 | |
| | 2.0 | 449/254 | |
| N,N-Diethyl-acetamide | 0.25 | 276/238 | |
| | 0.5 | 379/238 | |
| | 1.0 | 335/238 | |
| N,N-Dipropyl-acetamide | 0.16 | 340/238 | |
| | 0.31 | 390/238 | |
| N,N-Dimethyl-thioacetamide | 0.063 | | 296/256 |
| | 0.125 | 288/254 | 330/256 |
| | 0.25 | 145/254 | 322/256 |
| N,N-Dimethyl-acetoacetamide | 0.5 | 293/254 | |
| | 1.0 | 286/254 | |
| | 2.0 | 380/254 | |
| N,N-Dimethylpro-pionamide | 0.5 | 363/254 | |
| | 1.0 | 369/254 | |
| | 2.0 | 282/254 | |
| N,N-Dibutylpro-pionamide | 0.0156 | | 418/256 |
| | 0.0312 | | 528/256 |
| | 0.0625 | | 350/256 |
| N,N-Diisobutyl-pripionamide | 0.063 | | 497/256 |
| | 0.125 | | 530/256 |
| N,N-Dimethyl-butyramide | 0.125 | 322/254 | |
| | 0.25 | 303/254 | |
| | 0.5 | 318/254 | |
| N,N-Dimethyl-valeramide | 0.063 | 308/254 | |
| | 0.125 | 325/254 | |
| | 0.25 | 355/254 | |
| N,N-Dimethyldo-decanamide | 0.0156 | | 291/256 |

EXAMPLE 6

Antibiotic Production; Addition of Carbamates

The procedure of Example 5 was repeated except that various carbamates were substituted for the amides recited therein. The following table describes these carbamates and indicates the concentrations at which they were employed and the yield of antibiotic (I) attributed thereto:

TABLE VI

| Additive | % Final Concentration | Antibiotic Production (μg/ml) with Additive/Control | |
|---|---|---|---|
| | | No. 1 | No. 2 |
| Ethyl-carbamate | 0.2 | 353/254 | 398/273 |
| | 0.4 | 347/254 | 395/273 |
| n-Propyl-carbamate | 0.1 | 360/254 | 386/273 |
| | 0.2 | 348/254 | 417/273 |
| n-Butyl-carbamate | 0.1 | | 345/273 |
| Ethyl N-Methyl-carbamate | 0.2 | 321/254 | 360/273 |
| | 0.4 | 333/254 | 323/273 |
| Ethyl N-Ethyl-carbamate | 0.1 | 343/254 | 317/273 |
| | 0.2 | | 391/273 |
| Ethyl N-Propyl-carbamate | 0.1 | 361/254 | 389/273 |
| | 0.2 | 363/254 | 409/273 |
| Ethyl N-2-Hydroxy-ethylcarbamate | 0.2 | 331/254 | 345/273 |
| | 0.4 | 353/254 | 442/273 |
| | 0.8 | 349/254 | 428/273 |
| Ethyl N,N-Dimethylcarbamate | 0.2 | | 292/273 |
| | 0.4 | | 339/273 |

What is claimed is:

1. In the method for preparing 7-(D-5-amino-5-carboxyvaleramido)-3-(carbamoyloxymethyl)-7-methoxy-3-cephem-4-carboxylic acid by growing *Streptomyces lactamdurans* or a mutant thereof in a nutrient medium; the improvement which comprises adding a member selected from the group consisting of glycine, L-phenylalanine, a carbamate, an amide or combinations thereof to the fermentation medium.

2. The method of claim 1 wherein the pH of the aqueous nutrient medium is in the range of from about 6.0 to 8.0 and contains between about 1 percent and 6 percent by weight of carbohydrate and between about 0.2 percent and 6 percent by weight of available nitrogen.

3. The method of claim 1 wherein the carbamate is a compound of the formula:

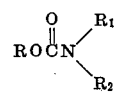

wherein R is alkyl and $R_1$ and $R_2$ are the same or different members selected from hydrogen, alkyl or hydroxy-lower alkyl; and the amide is a compound of the formula:

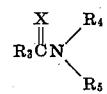

wherein $R_3$ is a hydrogen, alkyl, oxo substituted lower alkyl or aryl and $R_4$ and $R_5$ are the same or different members selected from hydrogen, alkyl, or hydroxy-lower alkyl.

4. The method of claim 3 wherein the amide is formamide or N,N-di-lower alkyl formamide.

5. The method of claim 3 wherein the amide employed is N,N-diisobutylpropionamide at a concentration of from about 0.063 – 0.125 percent.

6. The method of claim 3 wherein the carbamate employed is N-2-hydroxyethylcarbamate at a concentration of from about 0.2 – 0.8 percent.

7. The method of claim 3 wherein the carbamate or amide is employed at a concentration of from about 0.0156 – 2.0 percent.

8. The method of claim 3 wherein the amide is N,N-dimethylformamide.

9. The method of claim 1 wherein glycine is employed at a concentration of from about 0.01 – 0.10 percent.

10. The method of claim 1 wherein L-phenylalanine is employed at a concentration of from about 0.05 – 0.3 percent.

11. In the method for preparing 7-(D-5-amino-5-carboxyvaleramido)-3-(carbamoyloxymethyl)-7-methoxy-3-cephem-4-carboxylic acid by growing *Streptomyces lactamdurans* in a nutrient medium, the improvement which comprises using 0.05% glycine, 0.3% L-phenylalanine, 0.2 – 0.8 percent ethyl N-2-hydroxy-ethylcarbamate or 0.063 – 0.125 percent N,N-diisobutylpropionamide as an additive to the fermentation medium to improve the yield of antibiotic.

12. The method of claim 11 wherein either N-2-hydroxyethylcarbamate or N,N-diisobutylpropionamide is used in combination with glycine and L-phenylalanine.

* * * * *

UNITED STATES PATENT OFFICE
CERTIFICATE OF CORRECTION

Patent No. 3,769,169    Dated October 30, 1973

Inventor(s) Jerome Birnbaum and Edward Inamine

It is certified that error appears in the above-identified patent and that said Letters Patent are hereby corrected as shown below:

In Column 9, Table V, the name of the third additive should correctly be "N,N-Dimethyl-formamide".

Signed and sealed this 2nd day of April 1974.

(SEAL)
Attest:

EDWARD M. FLETCHER, JR.
Attesting Officer

C. MARSHALL DANN
Commissioner of Patents